Dec. 12, 1944.   L. H. BLOOD ET AL   2,365,043
MILLING MACHINE
Filed April 6, 1939    5 Sheets-Sheet 1

INVENTOR.
LOUIS H. BLOOD
HANS ERNST
BY
H. K. Parsons
ATTORNEY.

Dec. 12, 1944.    L. H. BLOOD ET AL    2,365,043
MILLING MACHINE
Filed April 6, 1939    5 Sheets-Sheet 2

INVENTOR.
LOUIS H. BLOOD
HANS ERNST
BY
ATTORNEY.

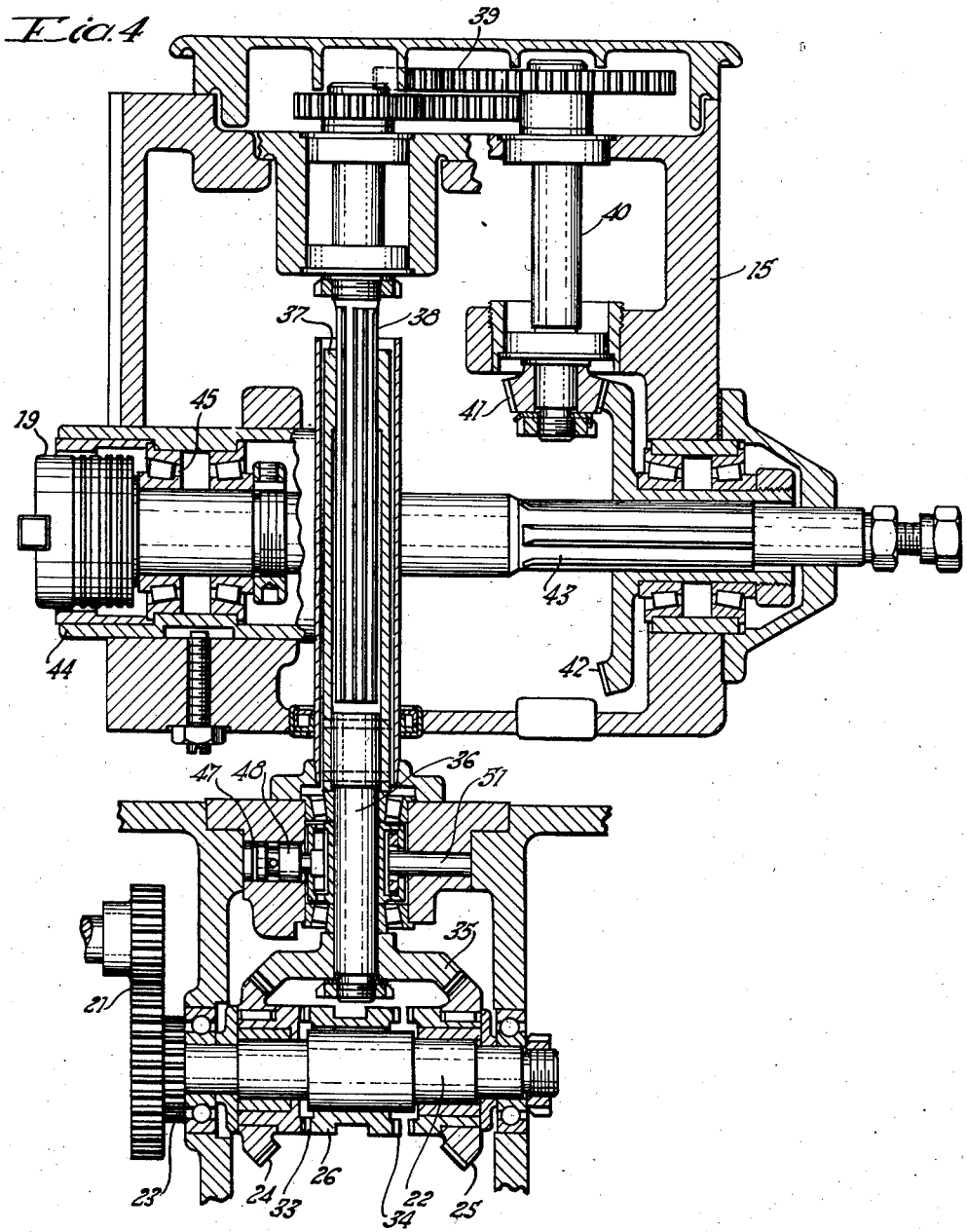

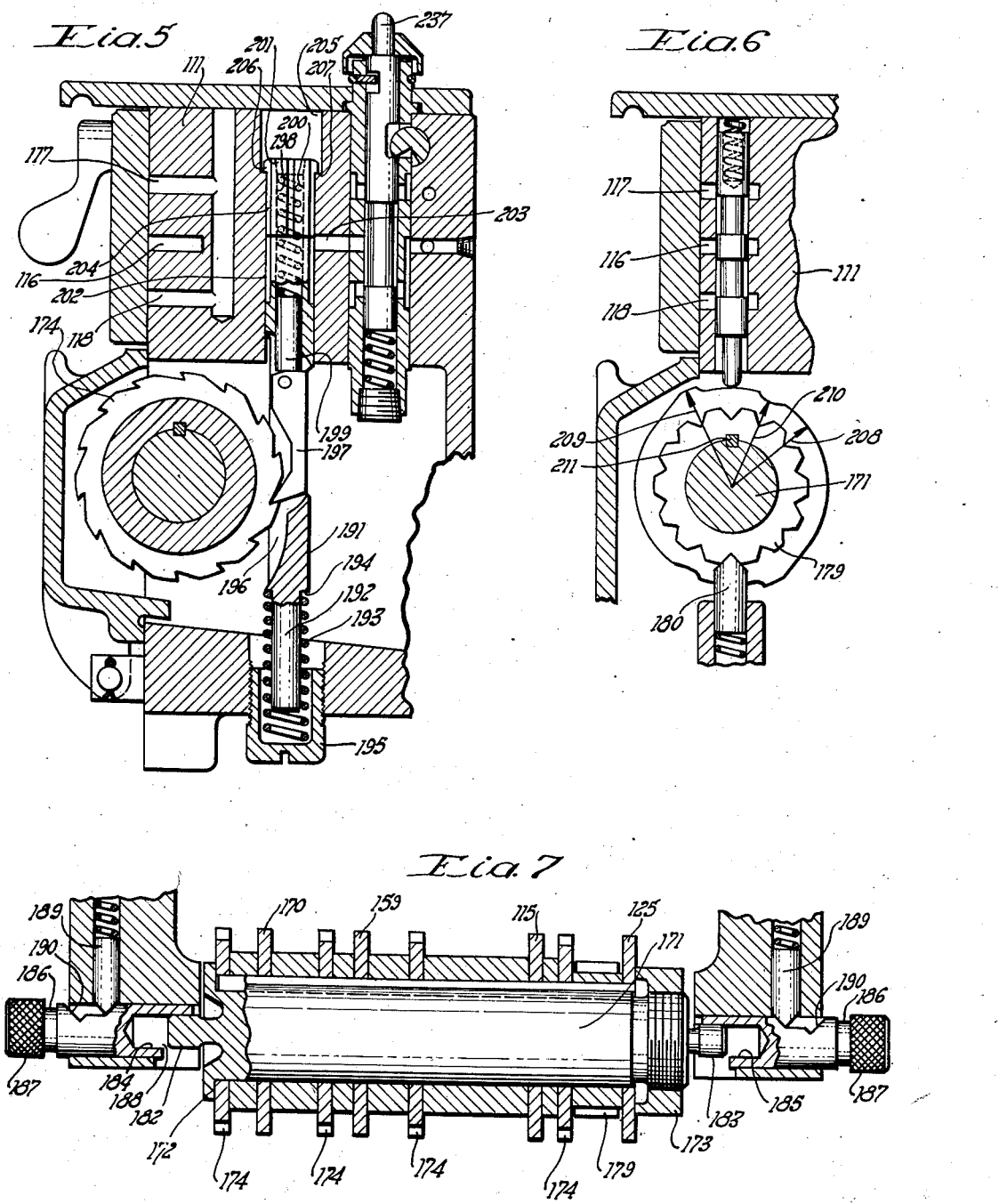

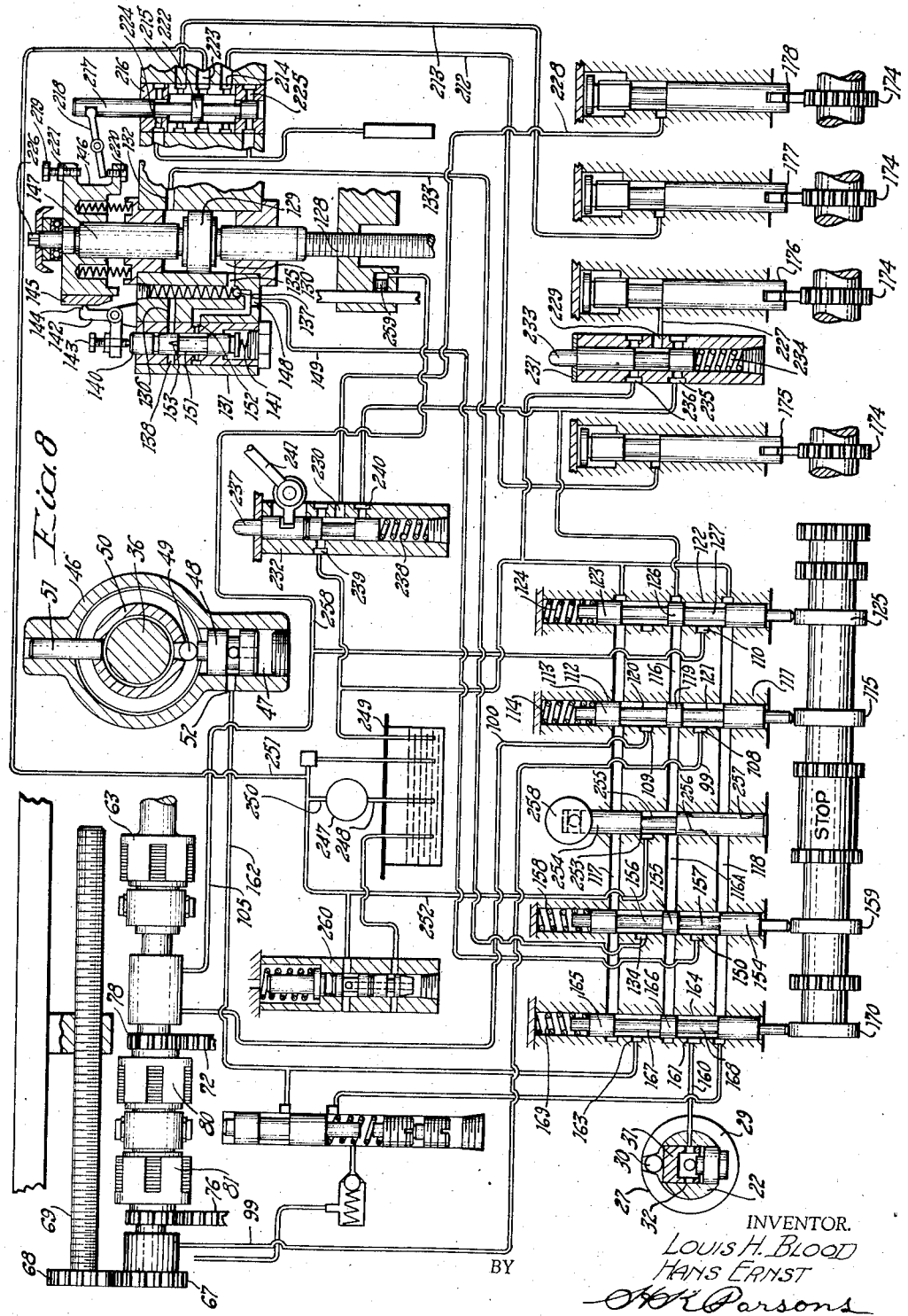

Patented Dec. 12, 1944

2,365,043

UNITED STATES PATENT OFFICE 2,365,043

MILLING MACHINE

Louis H. Blood, Covington, Ky., and Hans Ernst, Cincinnati, Ohio, assignors to The Cincinnati Milling Machine Co., Cincinnati, Ohio, a corporation of Ohio Application April 6, 1939, Serial No. 266,332

10 Claims. (Cl. 90—21)

This invention relates to machine tools and more particularly to improvements in bench type milling machines.

Relatively small milling machines of the type suitable for mounting on a bench have the very simplest of controls, and in many cases the table can only be fed by hand which results in an uneven feed rate. Furthermore, manual feeding becomes very tiresome if continued for any considerable length of time. On account of the small size of the machine and the very limited space, it is very difficult to follow the principles utilized in designing larger machines in order to provide a transmission and control mechanism which would render a small machine as flexible in automatic cycle control as larger machines.

There is, however, a demand for a small milling machine of the type under consideration for production manufacture of small parts, but in order to be useful for such a purpose it is desirable that the machine have automatic control to some degree.

One of the objects of this invention is to provide a compact automatic cycle control mechanism which may be incorporated in a small milling machine to yield any automatic cycle of which full-sized machines are capable.

Another object of this invention is to provide a full automatic cycle bench miller with accurate automatic tripping mechanism whereby very small feed movements of the order of one-sixteenth of an inch become available.

A further object of this invention is to provide an improved control mechanism with a changeable automatic cycle control part for which other parts may be substituted to yield different cycles.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts:

Figure 4 is a vertical section showing the transmission mechanism for the cutter spindle as viewed on the line 4—4 of Figure 3.

Figure 5 is an enlarged section on the line 5—5 of Figure 1 showing the details of the ratchet mechanism.

Figure 6 is a detail view showing one of the control cams and the detenting mechanism.

Figure 7 is a cross sectional view through a removable program assembly unit as viewed on the line 7—7 of Figure 1.

Figure 8 is a diagrammatic view of the hydraulic control circuit.

Figure 1:
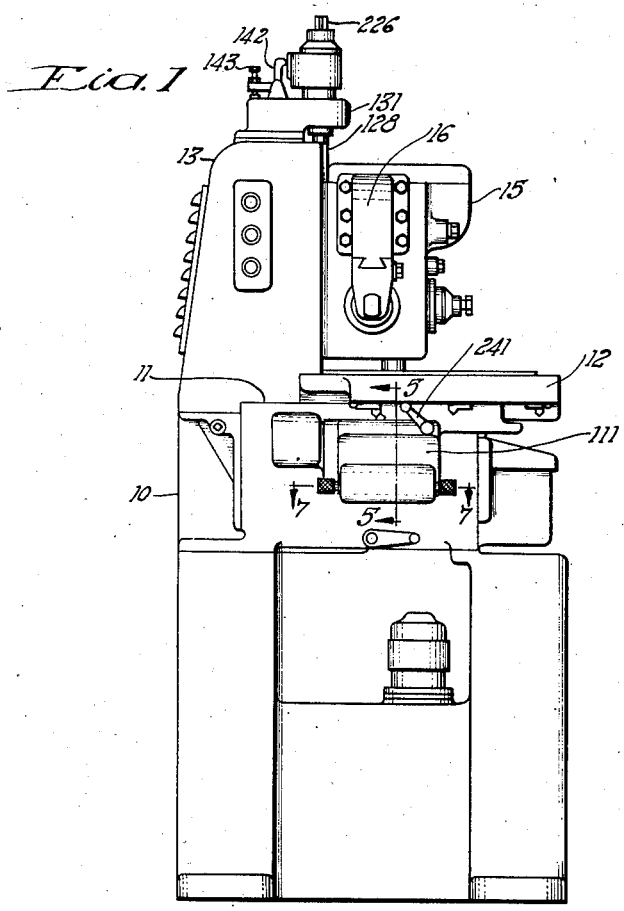
Figure 1 is a front elevation of a machine embodying the principles of this invention.
Figure 2:
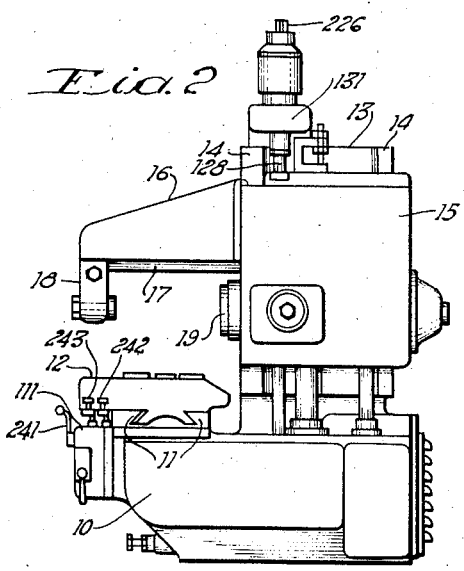
Figure 2 is a side elevation of the machine shown in Figure 1.

In Figures 1 and 2 of the drawings there is shown a front and side elevation of the machine embodying the principles of this invention. The complete machine is shown in Figure 2 in the form adaptable for mounting on a bench, while in Figure 1 the machine is shown mounted on a separate bed. In these views the reference numeral 10 indicates the bed of the machine upon which is formed guideways 11 for supporting the reciprocating work support or table 12. The bed of the machine is provided with an upstanding portion 13 upon which is formed guideways 14 for receiving a vertically adjustable spindle carrier 15. The spindle carrier has an overarm 16 fixedly attached thereto, which is provided on the underside with guideways 17 upon which a pendant 18 may be slidably adjusted and fixed in position. A cutter spindle 19 is rotatably supported in the spindle carrier and is bodily adjustable therewith with respect to the surface of the table 12.

Figure 3:
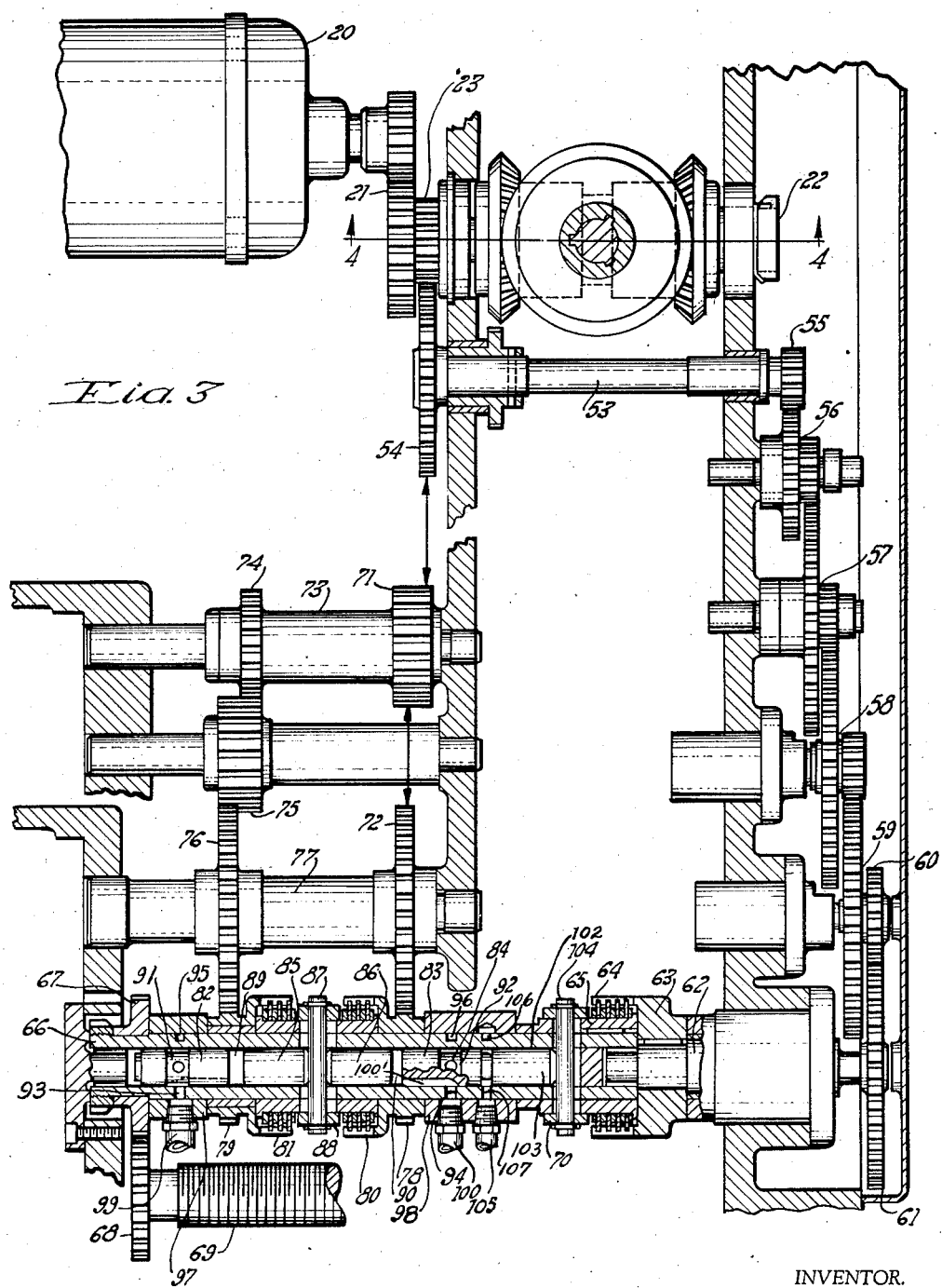
Figure 3 is an expanded view of the table transmission mechanism.

A common prime mover 20, shown in Figure 3, is provided for driving the table and the cutter spindle. The motor 20 drives, through gearing 21, a common drive shaft 22 which is shown more particularly in Figure 4. This shaft carries a gear 23 which actuates a first branch transmission for driving the table; and a pair of bevel gears 24 and 25 which serve to drive the cutter spindle through a second branch transmission.

Referring more particularly to Figure 4, a clutch member 26 is slidably mounted on the shaft 22, and is adapted to be connected with the shaft by a hydraulic clutch which is indicated by the reference numeral 27 in Figure 8. This clutch consists of a split ring 29 and a ring expanding member 30 which is radially actuated by a hydraulic piston 31 which is reciprocably mounted in a cylinder 32 formed in the shaft 22.

By admitting fluid pressure to the cylinder the piston 31 is forced outward, thereby causing expansion of the ring 27 into engagement with the interior of the clutch member 26. The clutch has teeth 33 and 34 on opposite ends thereof for interengagement with corresponding clutch teeth formed on opposing faces of the bevel gears 24 and 25 for opposite rotation thereof. The bevel gears 24 and 25 intermesh with a common bevel gear 35 which is attached to the end of a vertical shaft 36 anti-frictionally supported in the bed 10. The shaft 36 is held against vertical movement but has a splined connection at 37 with a splined shaft 38 which depends from the upper end of the spindle carrier 15. The shaft 38 is connected by change gears, indicated generally by the reference numeral 39, to a parallel shaft 40 which carries a bevel pinion 41 intermeshing with a large bevel gear 42 splined on the end of the cutter spindle 19. The bevel gear 42 is supported on anti-friction bearings in the rear wall of the carrier and is held against axial movement while the splined portion 43 of the spindle 19 is adapted to be moved axially of the bevel gear 42 which permits the forward end of the spindle to be mounted in a quill 44.

The forward end of the spindle is anti-frictionally journaled by bearings 45 in the quill for rotation relative thereto. The spindle transmission is provided with a hydraulic brake which is indicated generally by the reference numeral 46 in Figure 8. The bed 10 is provided with a cylinder 47 in which is reciprocably mounted a piston 48 adapted to engage a ball 49 inserted between the tapered ends of an expansion brake ring 50 which surrounds the shaft 36. The ring is held against rotational movement by a fixed pin 51.

By introducing pressure into the cylinder through port 52 the piston 48 is urged in a direction to cause the ball 49 to spread the ring 50 out of engagement with the shaft 36 and upon release of pressure in the cylinder 47, the parts retract and the resiliency of the ring 50 causes it to contract and engage the shaft 36, thereby applying a braking pressure thereto.

The table transmission which is shown in Figure 3 comprises a feed train and a rapid traverse train. A common shaft 53 for actuation of these trains is supported in the bed 10 and provided on one end with a large spur gear 54 which intermeshes with the drive gear 23. The other end of the shaft 53 is provided with a spur gear 55 which actuates the feed train. This train comprises four gear couplets 56, 57, 58 and 59, the larger gear of which interengages with the smaller gear of the preceding couplet. The pinion 60 of couplet 59 drives gear 61 which is keyed to the end of shaft 62. This shaft carries a clutch member 63 which drives one-half of the plates of a friction disc clutch 64. The friction disc clutch constitutes a feed rate control clutch, and the inner portion 65 of this clutch is keyed to a tubular shaft 66 which terminates in a gear 67 for driving a gear 68 secured to the end of the table feed screw 69. A hydraulically actuated member 70 serves to cause frictional engagement of the discs of the clutch and thereby establish a driving relation between the shaft 62 and the tubular shaft 66.

The rapid traverse train is driven by the gear 54 which intermeshes with a gear 71 that drives gear 72 in one direction. The gear 71 is integral with a sleeve 73 upon which is formed a second gear 74. The gear 74 is connected through an intermediate idler gear 75 for rotation of gear 76, which is supported for free rotation on a shaft 77, in a direction opposite to that of gear 72.

The result is that the gear 72 is being continuously rotated in a direction opposite to the direction of rotation of the gear 76. These two gears, constitute rapid traverse gears, one of which effects rapid traverse of the table in one direction, while the other gear effects rapid traverse of the table in an opposite direction. These two gears drive pinions 78 and 79 which are supported for free rotation relative to the tubular shaft upon which they are supported, and are operatively connectible to the shaft through individual friction disc clutches indicated generally by the reference numerals 80 and 81.

It will be noted that the feed transmission is unidirectional and therefore the table can only be fed in one direction, while the rapid traverse transmission terminates in oppositely driven members whereby the table can be moved at rapid traverse in either direction. The machine can, of course, be arranged to have the uni-directional feed in the other direction by substituting a lead screw of opposite hand to the lead screw 69.

The feed control clutch 64 and the two rapid traverse control clutches 80 and 81 are adapted to be hydraulically actuated, and to this end the tubular shaft is divided into cylinders by fixed plugs 82 and 83. These plugs are inserted in the interior of the tube in proper position and secured thereto by diametrical pins 84 which pass through the tube and the plug. A pair of pistons 85 and 86 are mounted within the tube between the plugs 82 and 83, and the adjacent ends of these pistons engage a diametrical cross pin 87 which is connected to a clutch actuating ring 88.

The piston 85 may, therefore, be said to slide in a cylinder 89, and the piston 86 to slide in a cylinder 90. The fixed plugs 82 and 83 have annular grooves 91 and 92 respectively which intercommunicate with ports 93 and 94 formed in the tubular sleeve and these ports, in turn, are in constant communication with annular grooves 95 and 96 formed in the periphery of the sleeve. Fixed collector rings 97 and 98 surround the grooves 95 and 96 and delivery channels 99 and 100 are connected to these rings whereby the channels are always in communication with the cylinders during rotation of the shaft. The plugs 82 and 83 each have an elongated groove 100' cut in its periphery to form a communication channel between the annular groove and the cylinder adjacent thereto. It will now be apparent that if pressure is connected to channel 99 while channel 100 is connected to exhaust that the piston 85 will be forced to the right as viewed in Figure 3 and effect engagement of the rapid traverse clutch 80; while if the pressure is connected to the channel 10 while channel 99 is connected to exhaust the piston 86 will be moved to the left as viewed in Figure 3 and effect engagement of clutch 81 and disengagement of clutch 80. Since these are friction disc clutches it will be apparent that if channels 99 and 100 are both connected to exhaust that no pressure will be exerted on either of the clutches 80 and 81 and they will, therefore, be automatically disengaged.

The plug 83 also serves to form a cylinder 102 in which is slidably mounted a piston 103 for actuation of a cross pin 104 which is connected to the member 70 for actuation of the feed clutch. Pressure is supplied to the cylinder 102 through a pipe 105 which is connected to the collector ring 94 and annular groove 106 is formed in the tubular shaft opposite the pipe 105 for collecting fluid and delivering it through radial bore 107 to cylinder 102. It will be obvious that when pressure is admitted to the channel 105 that the feed clutch will be engaged, and when the channel 105 is connected to exhaust that the feed clutch will automatically disengage.

Referring to Figure 8, the channels 99, 100 and 105 are connected to ports 108, 109 and 110 respectively, which are formed in a valve block indicated generally by the reference numeral 111 and which is mounted on the front of the machine as shown in Figures 1 and 2. This valve block has a bore 112 in which a pilot valve plunger 113 is mounted for reciprocation, movement in one direction being effected by a spring 114 and movement in the opposite direction being effected by a contoured member in the form of a cam 115. The valve block has a pressure groove 116 and a pair of exhaust grooves 117 and 118 which extend lengthwise of the valve and block and which intersect each one of a series of pilot valve plungers. The pilot valve plunger 113 has a central spool 119 which shuts off pressure communication from ports 108 and 109; and a pair of annular grooves 120 and 121 which establish communication of ports 108 and 109 with the exhaust grooves 118 and 117 respectively. Thus, in the position shown, both of the rapid traverse clutches are disengaged.

The port 110 from the feed clutch communicates with a bore 122 in which is slidably mounted a valve plunger 123 which is urged in one direction by a spring 124 and in the opposite direction by a cam 125. This plunger has a central spool 126 for disconnecting the pressure groove 116 from port 110; and an annular groove 127 on one side of the spool for connecting the port 110 to the exhaust groove 118. Thus, in the position shown, the feed clutch is disengaged and no motion will be transmitted to the table.

The spindle carrier 15 is adapted to be moved up and down a limited amount by hydraulic pressure and to this end a lead screw 128, which is threaded in the carrier, is provided on the upper end with a piston 129 which is reciprocable in a cylinder 130 formed in a block 131 that is integrally attached to the upper end of the column 13. The cylinder 130 is provided at one end with a port 132 which is connected by channel 133 to port 134 in the valve block 111.

The other end of the cylinder has a port 135 which communicates with an interdrilled passage 136. A ball check valve 137 is mounted in one end of this passage and the other end terminates in a port 138 of a rate control valve, having a plunger 140 which is urged upward, as viewed in Figure 8, by a spring 141. A bell crank lever 142 is pivotally mounted on the block 131 and carries an adjustable screw 143 threaded in one arm for engaging the end of the plunger, and a V-shaped end 144 on the other arm which rides on a cam member 145 carried by a block 146 attached to the upper end of the piston rod 147. The block 131 has a port 148 to which channel 149 is connected, the other end of the channel terminating in port 150 formed in the valve block 111. When pressure is admitted to channel 149 the ball check valve 137 opens and fluid is readily admitted to the lower end of the cylinder 130 to effect rapid upward movement of the spindle carrier.

When the channel 149 is connected to exhaust and the channel 132 is connected to pressure, the piston 129 is forced downward. The fluid ahead of the piston is, however, forced into the passage 136 due to the closing of the ball check valve 137. The fluid must then pass through the rate valve which has an annular groove 151 which is adapted to interconnect the port 138 with a port 152 which is in direct communication with the port 148. When the rate plunger 140 is sufficiently elevated to reduce the hydraulic resistance between port 138 and port 152, the spindle carrier moves downward at a rapid rate. As the cam member 145 rotates the bell crank 142 in a counterclockwise direction the rate control plunger 140 is moved downward to constrict the port 138 and thereby retard the escape of fluid from the lower end of the cylinder 130.

This restriction is effected by cutting V-shaped grooves 153 in the spool 154 which normally would close the port 138. It will now be evident that the spindle carrier may not be moved upward at a feed rate but may be moved downward first at a rapid traverse rate and then at a feed rate. The ports 134 and 150 in the valve block 111 which form the termini of channels 133 and 149 are alternately connectible to pressure and exhaust by the reversing valve plunger 154 which has a central spool 155 adapted to disconnect the pressure groove 116 from ports 134 and 150 when the plunger is in a central position. Annular grooves 156 and 157 formed on opposite sides of the spool 155 serve to alternately connect one of the ports 134, 150 to the pressure groove 116 and the remaining port to one of the exhaust grooves. The plunger 154 is continuously urged in one direction by a spring 158 and moved in the other direction by a cam 159.

As previously mentioned, a hydraulic clutch was provided for connecting the cutter spindle to the spindle transmission for actuation thereof and a hydraulic brake was also provided for stopping the spindle after the clutch was disengaged. As shown in Figure 8, the spindle clutch 29 is connected by a channel 160 to port 161 in the valve block 111 and the hydraulically actuated spindle brake 46 is connected by channel 162 to port 163 in the valve block 111. These two ports communicate with a single bore 164 in which is reciprocably mounted a control valve plunger 165 which has a central spool 166 for disconnecting the pressure groove 116 from both of the ports, and annular grooves 167 and 168 on opposite sides thereof for alternately connecting the pressure groove to these ports, and the remaining port to exhaust.

This plunger is urged in one direction by a spring 169 and in the opposite direction by a cam 170. The feed cam 125, the rapid traverse control cam 115, the spindle carrier control cam 159 and a spindle clutch and brake control cam 170 are all splined on a shaft 171 as shown in Figure 7.

The shaft 171 and assembled cams constitute a program determining unit which is removable from the machine as a unit whereby other preassembled units may be substituted therefor to effect a different cycle of operation of the machine. As each event of a given program is completed, the program determining unit is indexed to institute the next event. The indexing is effected by the movable slides and a series of fluid operable indexing plungers are provided so that regardless of the slide being moved, or its direction of movement it is possible to place dogs that will effect an indexing movement when the particular slide movement has been completed. In other words, all of the trip instrumentalities act upon the indexing system and this in turn causes the program determining unit to be advanced step by step and thus institute the successive events in the program.

The shaft 171, Figure 7, is provided with an integral shoulder 172 on one end, and a threaded nut 173 on the other end, and between these two elements are assembled the various cams, spacers and ratchet wheels. The cams are, of course, spaced apart in accordance with the spacing of the valve plungers so that they will ride on the periphery of the cams, as shown in Figure 6, while the ratchet wheels 174 are spaced apart in accordance with the spacing of the ratchet plungers 175, 176, 177 and 178. A detent wheel 179 is keyed on the shaft 171 and a spring pressed detent 180 is supported for engagement with the wheel, thereby holding the parts in various indexed positions.

The shaft 171 is provided with journal portions 182 and 183 on opposite ends thereof for interengagement with sockets 184 and 185 formed in the ends of axially adjustable members 186. These members have knurled heads 187 by means of which the members may be moved. It will be noted from Figure 7 that the ends of the sockets 184 and 185 have a portion of the side wall cut away as indicated at 188 whereby the journal portions may be moved laterally into axial alignment with the sockets. When this has been accomplished, the members 186 are moved toward one another, thereby securing the shaft 171 in proper position with respect to the various cooperating plungers. To prevent accidental return of the bearing members, spring pressed detents 189 are provided which engage V-shaped notches 190 formed on the bearing members. It will be noted that one side wall of the notches is cut away which makes it possible to withdraw the bearing members against the action of the detents when it is desired to remove the program determining units.

Each indexing plunger is of the construction shown in Figure 5 and comprises a cylindrical member 191 which has a reduced end 192 surrounded by a spring 193 interposed between a shoulder 194 and a fixed plug 195 for constantly urging the plunger upward as viewed in Figure 5 to a return position. The member 191 has an elongated slot 196 in which is pivotally mounted a ratchet pawl 197. A bore 198 is formed in the upper end of the member for receiving a plunger 199 and a spring 200.

The upper end of the bore is closed by a plug 201 whereby the spring urges the plunger 199 downward against the heel of the pawl 197, thereby continuously urging the same into engagement with the periphery of a ratchet wheel 174.

The upper end of the member 191 is also provided with an annular groove 202 which is always in communication with a port 203. Between the annular groove 202 and the upper end of the member 191 is a series of axially extending grooves 204 whereby operating fluid entering the annular groove 202 may flow to the cylinder 205 and thereby exert pressure on the upper end of the ratchet plunger and urge it downward.

A shoulder 206 on the upper end of the plunger engages a shoulder 207 formed at the end of the cylinder for limiting or determining the length of plunger movement. In other words, the end walls of the chamber 205 determine the stroke of the plunger and this stroke is always the same.

An important feature of this invention is the variation in the number of steps or events that it is possible to incorporate in one program. As illustrative of what can be accomplished and this depends upon the stroke of the index plungers and the diameter of the ratchet wheels, provision has been made for obtaining as high as 24 steps or events in one cycle. This means that each indexing movement of shaft 171 would be through an angle of 15 degrees and the ratchet wheels would be provided with 24 teeth. As the number of events decrease the number of ratchet teeth will be decreased down to a limit of 13. It will be obvious that for 13 steps the angle of index would be between 27 and 28 degrees. The fixed stroke of the index plunger is therefore limited to the equivalent of 28 degrees, which prevents the plunger from picking up two teeth when 24 teeth are provided.

On the other hand, if a ratchet wheel had 12 teeth, the fixed stroke of the ratchet plunger would not be sufficient to pick up the next tooth because the angle between teeth in that case would be 30 degrees. Therefore, between 12 steps and 7 steps the ratchet teeth are spaced to provide two cycles per revolution of the shaft 171; between 6 and 4 steps the ratchet teeth would be spaced to provide four cycles per revolution of the shaft 179; for 3 steps the ratchet teeth would be spaced to provide 8 cycles and for 2 steps the ratchet teeth would be spaced to provide 12 cycles per revolution of the shaft.

Since the ratchet wheels constitute part of the program determining unit it will be apparent that in making up one of these units that it is only necessary to provide the proper ratchet wheels in accordance with the number of events that it is desired to effect in one cycle.

The means for effecting the indexing is part of the machine and common to all of the units. Thus, each unit carries its own means for determining the angle at which it shall be indexed at each indexing operation.

In making up a program determining assembly, ratchet wheels 174 having the proper number of teeth are first selected, and the cams are then divided into sectors, the angular extent of each sector being equal to the angular distance between a pair of teeth of the selected ratchet wheel. Since all of the control valve plungers are capable of three positions, each cam may be said to have a common radius such as indicated by the reference numeral 208 in Figure 6 for holding the valve plunger in a central position, and then this radius is increased to the dimension indicated by the reference numeral 209 or decreased to the dimension indicated by the reference numeral 210 on the dividing line between sectors to cause movement of the plunger, either up or down from its neutral position in accordance with the requirements of each station. It thus becomes possible to not only vary the number of steps or events in a given cycle, but also to vary the collective effects of the cams at each station of any cycle.

Each cam is provided with a keyway 211 which may serve as a reference point for laying out the several cams composing a given assembly so that when assembled on the shaft 171 they will be in cooperative relation with one another.

The hydraulic operation of the indexing plungers is controlled by dog actuated pilot valves. For instance the plungers 175 and 177 are connected by channels 212 and 213 to ports 214 and 215 of a pilot valve 216. This valve has a plunger 217 which is operatively connected to a trip lever 218.

The end of this lever lies in the path of trip members 219 and 220 which are in the form of axially aligned screws carried by the member 146. Since the spindle carrier always returns to the same upper position, it is not necessary to adjust the screw 220, but the downward movement of the spindle carrier may vary, and this variation is taken care of by adjusting the screw 219 and then locking it by a nut 221. The plunger 217 has a central spool 222 which is larger in diameter than opposing spools on opposite ends of the plunger whereby after the spool 222 passes the central pressure port 223 it is self-actuated, the remainder of the stroke. When the plunger is up, the pressure port 223 is connected to port 214 to cause actuation of the index plunger 175 while the index plunger 177 is connected to an exhaust port 224. When the plunger is down the pressure port 223 is connected to port 215 to cause actuation of the index plunger 177 and simultaneously connect the index plunger 175 to the exhaust port 225.

Attention is invited to the fact that the piston 129 which moves the spindle carrier has a limited movement sufficient to move the cutter into and out of engagement with the work regardless of the distance that the surface of the work is from the top of the table. When the machine is set up the screw 128 is rotated by means of a wrench applied to the square end 226 of the piston rod to initially adjust the spindle carrier and thereby the cutter so that when the piston 129 is moved down the cutter will engage the work to the proper depth.

The indexing plungers 176 and 178 are connected by channels 227 and 228 to ports 229 and 230 of pilot valves 231 and 232 respectively. The pilot valve 231 has a plunger 233 which is adapted to be depressed by dogs carried by the table against the compression of a spring 234. This valve has a pressure port 235 and an exhaust port 236. The spring 234 normally holds the plunger in a position to connect the channel 227 to the exhaust port 236. When the plunger is depressed the pressure port is connected to channel 227 to cause operation of the index plunger 176.

The valve 232 has a plunger 237 which is adapted to be depressed against the compression of spring 238 by trip dogs carried by the table. The spring normally holds the plunger in a position to connect the port 230 to exhaust port 239. When the plunger is depressed a pressure port 240 is connected to channel 230 to cause operation of the index plunger 178. This plunger also has an operative connection to a manually operable control lever 241, which lever is mounted on the front of the machine and is utilized to start the cycle. Although the machine may be provided with a continuously repeating cycle, it is usual on small machines to provide a stop position at the end of each cycle so that the work may be changed. Thus, in order to start the next cycle it is necessary to manually operate the lever 241 so as to index the program determining assembly into its first operation position.

Since each trip plunger 233 and 237 effect the same result in the sense that they each cause indexing of the program determining assembly unit in one step, two plungers have been provided in connection with the table, whereby one is utilized for actuation by successive dogs during travel of the table in one direction and the other utilized for actuation by a separate set of dogs during travel of the table in the other direction and if all of the dogs are made in the form of latch dogs so as to be effective in only one direction, it will be apparent that only two plungers are necessary and that any number of indexing movements may be effected by the table during either direction of travel.

Referring to Figure 2, the control dogs for actuating one plunger during one direction of movement of the table may be mounted in T-slot 242, while the dogs to be operative during the other direction of table movement may be mounted in the T-slot 243.

Figure 9:
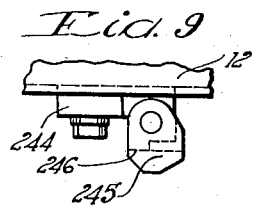
Figure 9 is a detail view of a latch dog.

A detail view of one form of latch dog is shown in Figure 9 and comprises a fixed portion 244 and a pivoted portion 245, the pivoted portion having a heel 246 which is effective to prevent rotation in one direction but does not interfere with rotation in the opposite direction.

Attention is invited to the fact that it is not necessary to limit one of the T-slots in the table to dogs controlling one direction of table movement, but such dogs might be mounted in either or both T-slots. The chief advantage of this and one which is believed to be novel with this invention is that by staggering the dogs an infinitesimally small feed movement can be obtained because while one dog is depressing a plunger, a second dog may be acting to depress a second plunger whereby rapid successive indexing can be effected. Since neither dog interferes with the setting of the other there is no problem of interference in positioning the dogs to obtain rapid indexing.

Fluid is supplied to the hydraulic control circuit by a pump 247 which has an intake 248 through which fluid is withdrawn from the reservoir 249 and a delivery line 250 which has a first branch connection 251 to port 223 of the carrier control valve, and a second branch 252 which is connected to port 253 of a set-up control valve plunger 254. The plunger 254 has an annular groove 255 for connecting port 253 to the pressure groove 116 of valve block 111.

The plunger 254 is provided with a longitudinally extending groove 256 on one side which terminates at one end in the annular groove 255; and a second longitudinal groove 257 located diametrically opposite the groove 256 which does not run out at either end.

When the plunger is raised by rotating the manually operable knob 258 the groove 256 serves to maintain pressure connection between the port 253 and section 116a of pressure groove 116; while the groove 257 connects the remainder of groove 116 to the reservoir groove 118.

This means that no pressure can be supplied to the plungers 113 and 123 which control the feed and rapid traverse clutches and therefore should the cam assembly be removed from the machine with pressure still in the system the table would not start to move.

Since the source of fluid pressure is not cut off from plungers 165 and 154 it is still possible to operate the vertical spindle carrier, or rotate the spindle for set-up purposes and since the trip plunger 237 which is manually controlled by the lever 241 is still effective for indexing purposes, it will be apparent that the program determining unit may still be indexed without causing feeding movement of the table.

An interlock has been provided to safeguard against movement of the spindle carrier while the table is feeding comprising a branch line 258 from channel 105 to an hydraulic spindle carrier clamp 259. Thus, when pressure is in channel 105 to cause engagement of the feed clutch, the spindle carrier is clamped against movement.

A relief valve 260 is connected to delivery channel 252 to limit the pressure that can be developed in the system.

There has thus been provided a transmission and control mechanism suitable for a small milling machine, said transmission having a minimum number of control members compatible with essential requirements for selective cyclic control; and said control mechanism comprising compact removable program determining units adapted to cooperate with a common pilot control circuit and indexing means whereby with a minimum amount of mechanism incorporated in the machine, it is possible to obtain a large number of different operating cycles or programs.

We claim:

1. In a milling machine having a work table and a spindle carrier, the combination of a mechanical transmission for effecting movement of the table including a plurality of fluid operable clutches for controlling the rate and direction of movement thereof, a plurality of cam operated control valves for controlling said clutches, said cams being operated to control actuation of said clutches in a predetermined cyclic order, and a pilot control circuit for indexing said cams including pilot valves associated with the table and spindle carrier for trip operation thereby.

2. In a milling machine having a support, a work table and a spindle carrier mounted on the support for relative movement in two directions, the combination with a prime mover, of a series of fluid operable devices selectively energizable for connecting said prime mover to cause relative movement between the supports including rate and direction clutches, a valve block mounted in said support, a series of valves in said block for controlling fluid operation of said devices having operating portions projecting from said block, a source of fluid pressure connected to said valves, a cycle program determining assembly removably mounted in the support and having spaced cams engageable with the respective portions for operation of said control valves, resiliently operable means for maintaining said portions in engagement with the respective cams, fluid operable ratchet means for rotating said assembly intermittently to cause operation of the machine in accordance with said predetermined program, and trip operable valves associated with the table and carrier for controlling fluid operation of said ratchet means.

3. In a machine tool having a tool support and a work support, the combination of a mechanical transmission for moving one of said supports, hydraulic transmission for moving the other of said supports, said mechanical transmission having a plurality of fluid operable clutches for controlling the rate and direction of one of said supports, a plurality of control valves for controlling the position of said clutches, other control valves for controlling operation of said hydraulic transmission, an indexible cycle control unit removably mounted in said machine and carrying means for determining the position of all of said valves and thereby the collective effect of said transmissions, a source of fluid pressure connected to said valves, fluid operable ratchet plungers for indexing said unit, and a series of trip operable pilot valves connected to the respective plungers for controlling actuation thereof, said pilot valves being associated with the respective supports whereby either support may control operation of the other support.

4. In a machine tool having a cutter support and a work support, the combination of transmission means for effecting relative movement between the supports including fluid operable rate and direction clutches, a source of fluid pressure for actuating said clutches, control valves for selectively connecting said source of pressure to said clutches, an indexible self-contained unit removably mounted in the machine and having means for actuating the several valves, said unit having a predetermined number of stations per revolution for controlling one or more cycles of operation of the machine, means carried by the unit for determining its station angle and thereby the number of machine cycles effected per revolution, a series of fluid operable indexing plungers for said unit, said plungers having a constant length of stroke whereby they are effective over a predetermined range of station angles.

5. In a machine tool having a tool support and a work support, the combination of a first transmission for moving one of said supports including a plurality of fluid operable control clutches, a second transmission for moving the other of said supports including fluid operable means, a plurality of control valves for the respective fluid operable devices, a source of fluid pressure for supplying said valves, an indexible cycle control unit having motion transmitting connections with each of said valves whereby successive positions of said unit will produce different collective effects on said transmission, and means to disconnect said source of pressure from certain of said valves to prevent operation of one of said transmissions.

6. In an automatic cycle control mechanism for a machine tool having a pair of relatively movable supports and separate transmission means for moving each support, the combination of a series of valve members for controlling the effect of each transmission, a source of fluid pressure connected to each of said valve members, a program determining unit having contoured members individual to the respective control valves for determining the position thereof, resiliently operable means for maintaining said valves in engagement with the periphery of said contoured members whereby said valves may be moved to any one of three positions and trip controlled fluid operable means for indexing said program control unit.

7. In a machine tool having a cutter support and a work support, the combination of transmission means for effecting relative movement between the supports including rate and direction determinators, an indexible program determining unit having a plurality of stations, means at each station for controlling operation of said determinators including means to produce a feeding movement at one station and a rapid traverse movement at the next station, fluid operable ratcheting means for indexing said unit, a pair of trip operable pilot valves associated with one of said supports and operatively connected for controlling actuation of different ratcheting means and dog means carried by the support and arranged for independently actuating said plungers during unidirectional movement of the support whereby the plungers may be operated in rapid succession to produce a short feed movement.

8. In an automatic cycle control mechanism for the transmission means of a machine tool, said transmission means having a plurality of fluid operable control members, the combination of a series of valve members for controlling fluid actuation of the control members, a program determining unit comprising a shaft and a plurality of cams attached thereto, said shaft having journal portions at opposite ends, socket bearings in the machine for receiving said portions to rotatably support the cams in opposition to said valve members, resiliently operable means for maintaining said valve members in contact with said cams, said valve members having a central inoperative position and control positions on either side thereof, a source of pressure connected to said valve members, and means for stopping the flow of fluid pressure to said valve members when the program determining unit is removed from the machine.

9. In an automatic cycle control mechanism for a machine tool having a table transmission, a tool support and fluid operable means for actuating the tool support, the combination of a source of pressure, a first series of valve members for controlling the flow of pressure to said fluid operable means, said table transmission having a plurality of fluid actuable control parts, a second series of valve members for controlling the admission of pressure to said parts, a program determining unit including a spline shaft having a plurality of cams thereon for engaging and controlling actuation of said valve members, said shaft having journal portions on opposite ends thereof, adjustable socket bearings for receiving said journal portions for supporting said unit for rotation, resiliently operable means for maintaining said valve members in engagement with the respective cams, said valve members having a neutral position and operative positions on either side thereof, and means to disconnect pressure from the second series of valve members to prevent operation of the table transmission when the unit is removed from the machine and releases said valves.

10. In a milling machine having a table, a spindle carrier, a tool spindle journaled in the carrier, a combination with transmission means for driving said parts including a rapid traverse determinator, a feed determinator, a start and stop control clutch for the spindle, a power operable brake for the spindle and an actuator for the spindle carrier, of a source of power for actuating said parts including individual control members for the respective parts for connecting said source of power to effect actuation thereof, a common controller operatively connected to all of said control members, said controller being indexable from station to station, individual means carried by the controller for simultaneously determining the position of all of said control members at a given station, and means trip operable by the table or spindle carrier to effect indexing of said control.

LOUIS H. BLOOD.
HANS ERNST.